July 13, 1965     H. R. HULETT     3,194,966
PHOTOSENSITIVE STAR TRACKING SYSTEM
Filed July 6, 1961
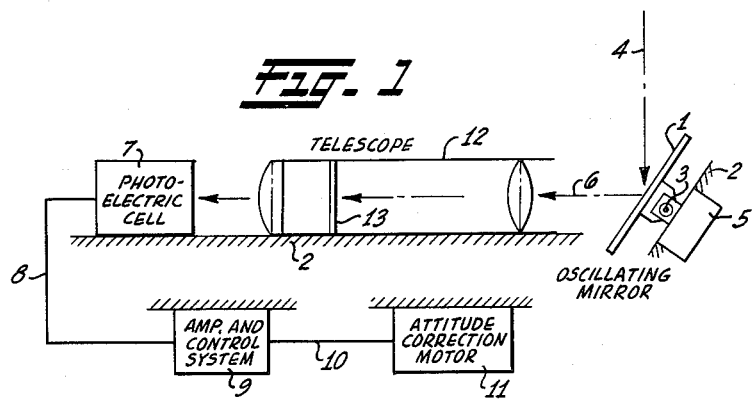
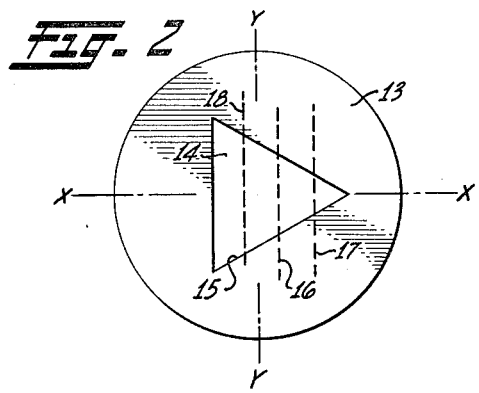
INVENTOR:—
HENRY R. HULETT
BY
ATTORNEYS ns=1" />

United States Patent Office 3,194,966
Patented July 13, 1965

3,194,966
PHOTOSENSITIVE STAR TRACKING SYSTEM
Henry R. Hulett, Portola Valley, Calif., assignor to American Radiator & Standard Sanitary Corporation, New York, N.Y., a corporation of Delaware
Filed July 6, 1961, Ser. No. 122,284
2 Claims. (Cl. 250—203)

This invention relates to and in general has for its object the provision of a sensor for sensing the attitude deviation of a space vehicle with respect to either or both of two reference axes, such as for example its yaw, roll or pitch axes.

More specifically, one of the objects of this invention is the provision of a sensor of the character above described including a mirror arranged to oscillate about a fixed axis and to receive a beam of light from a star along a line of incidence; a telescope in conjunction with the mirror; a window in the focal plane of the telescope-mirror system and having a contour asymmetrical with respect to an axis in the plane of the window normal to said fixed axis of rotation of the mirror; a photoelectric element arranged to receive the beam of light transmitted by the window; and means for oscillating said mirror at a predetermined amplitude, all these various components being so arranged that the oscillating reflected beam of light always cuts across at least a portion of said window, thereby to impress upon said photoelectric cell a pattern which is unique relative to the angularity of the beam of light incident on the mirror.

Another object of this invention is the provision of a sensor of the character above described in which the window or reticle is defined on no more than one side by a line which is parallel with the axis of oscillation of the mirror.

Still another object of this invention is the incorporation of a sensor of the character above described in an attitude control system including an attitude deviation control mechanism operating in response to signals from the sensor.

The invention possesses other adanvtageous features, some of which, with the foregoing, will be set forth at length in the following description where that form of the invention which has been selected for illustration in the drawings accompanying and forming a part of the present specification are outlined in full. In said drawings, one form of the invention is shown, but it is to be understood that it is not limited to such form, since the invention as set forth in the claims may be embodied in other forms.

Referring to the drawings:

FIG. 1 is a diagrammatic illustration of a system embodying the objects of my invention.

FIG. 2 is an enlarged diagrammatic detail of the reticle or window incorporated in the optical system of my invention indicating the light pattern impressed upon the photoelectric tube as a result of an attitude deviation with respect to either or both of two reference axes.

Referring more particularly to FIG. 1, it will be seen that the objects of my invention have been embodied in a system including a mirror 1 mounted on a frame 2 for oscillation about a fixed shaft or axis 3 and arranged to receive an incident light beam 4 from a point source of light, such as a star. Operatively associated with the mirror 1 is a motor 5 for oscillating the mirror at a predetermined cycle and through a predetermined amplitude.

Mounted on the frame 2 in the path of the reflected light beam 6 is a photoelectric cell 7 in circuit through a line 8 with an amplifying and control circuit 9, which in turn communicates through a line 10 with a two-axis attitude controller 11.

Disposed between the mirror 1 and the photoelectric cell 7 is an optical system generally designated by the reference numeral 12, and here shown in the form of a telescope. Mounted in the focal plane of the telescope is a reticle or framed window generally referred to by the reference numeral 13.

As best shown in FIG. 2, the opening 14 of the window 13 is of triangular configuration and asymmetrical with respect to the Y axis of the window, this axis being normal to the pivotal axis of the oscillating mirror 1. More particularly, it is to be noted that so long as no more than one side of the opening 14 is parallel with the X axis, the opening is perforce asymmetical with respect to the Y axis if it possesses no more than four sides. The configuration and size of the opening 14 should be so correlated with the amplitude of oscillation of the mirror 1, that the reflected and oscillated beam of light 6 will always cut across at least a portion of the opening 14 regardless of either the vertical or lateral deviation of the beam 6 resulting from an attitude deviation of the space ship to which the system is attached, in either of the two axes normal to the incident light beam 4 and which in FIG. 2 correspond to the X and Y axes.

In FIG. 2 the dash line 16 indicates the path of travel of the reflected beam due to the oscillation of the mirror through a predetermined amplitude. Here it will be seen that the portion of the line 16 above the opening 14 is of a length equal to the portion of the line below the opening 14, thus indicating that no deviation exists with respect to the X axis. Dash line 17 represents a situation wherein the reflected beam 6 has been displaced to the right as a result of an attitude deviation of the space vehicle relative to one of its axes. Here the total length of the line 17 is equal to the total length of the line 16, for the mirror has a fixed amplitude of oscillation. Again, the upper and lower intercepted portions of the line are equal to each other, thus indicating that there exists no deviation relative to the X axis. But the ratio of the intercepted portions of the beam to that passing through the opening 14 differs from the corresponding ratio of line 16, and this indicates a lateral displacement or deviation of the beam 4. Finally, the dash line 18 indicates a situation wherein an attitude deviation relative to one of the axes of the vehicle exists as well as an attitude deviation relative to another axis of the vehicle. The length of the line 18 is of course equal to the length of the lines 16 and 17. The length of the line encompassed by the opening 14 is longer than the encompassed portions of the lines 16 and 17 and the ratio of intercepted portion of the line above the opening to the intercepted portion of the line below the opening differs from the corresponding ratios of lines 16 and 17.

Thus, each position of the line on the window 13 traced by the reflected beam 6 produces a unique pattern of on and off pulses which can be sensed as square waves on the photoelectric cell 7 and translated thereby to demand signals transmitted through the amplification and control system to the attitude correction motor or controller 11. The motor then functions to correct the attitude deviation relative to the two reference axes in question and consequently the space vehicle is maintained on target with respect to a predetermined star.

Here it is to be particularly noted that by means of this relatively simple system it is possible simultaneously to correct for a deviation with respect to two reference axes.

Although a reticle symmetrical with respect to both the X and Y axes could be used, this would necessitate the use of additional circuitry to sense the direction of shift of the reflected light beam—that is, whether the shift was to the left or right of the Y axis and whether it was upward or downward relative to the X axis. By the employment of an asymmetrical configuration, such additional circuitry is avoided.

I claim:

1. A space vehicle attitude-sensing system comprising: a frame; a photoelectric tube mounted on said frame; a mirror pivoted to said frame in line with said photoelectric tube on a fixed axis for reflecting a beam of light from a point source of light to said photoelectric tube; means for oscillating said mirror about said fixed axis at a predetermined amplitude and frequency; a telescope associated with said mirror; a window frame in the focal plane of said telescope mirror assembly disposed between said photoelectric tube and said mirror and having an opening therein asymmetrical relative to an axis in the plane of said window normal to said fixed axis; and having no more than one side parallel to said fixed axis; the size of said opening and the amplitude of said oscillation being so correlated that the reflected beam moves through an amplitude at the plane of said opening greater than the maximum size of said opening in the direction of movement of said beam and so correlated that said reflected beam will always cut across at least a portion of said window.

2. A space vehicle attitude-sensing system comprising: a frame; a window frame having an opening therethrough disposed on said frame; a first means mounted on said frame for pivotal movement about a single fixed axis relative to said frame for imaging a beam of radiant energy from a point source on said window frame; a second means for oscillating said first means about said fixed axis at a predetermined amplitude; a third means for detecting radiant energy, said third means being disposed on said frame in line with said first and second means to detect said beam as it passes through the opening in said window frame; said opening being asymmetrical to an axis in the plane of said window normal to said fixed axis, and having no more than one side parallel to said fixed axis; the size of said opening and the amplitude of the oscillation of said first means being so correlated that the beam moves through an amplitude at the plane of said opening greater than the maximum size of said opening in the direction of movement of said beam and so correlated that the beam will always cut at least a portion of said opening.

References Cited by the Examiner
UNITED STATES PATENTS 2,509,705  5/50  Stolze et al. _____ 250—211 X
2,981,842  4/61  Kaufold et al. _____ 250—203 X RALPH G. NILSON, *Primary Examiner.*
ROBERT K. SCHAEFER, *Examiner.*